United States Patent [19]
Hill et al.

[11] 3,950,546

[45] Apr. 13, 1976

[54] PULVERULENT VITAMIN AND MINERAL-FORTIFIED CLAY PRODUCT FOR FARROWING HOUSE FLOOR

[75] Inventors: Robert L. Hill, Nashville; Max M. Edwards, McKenzie, both of Tenn.

[73] Assignee: Music City Supplement Company, Nashville, Tenn.

[22] Filed: Mar. 24, 1975

[21] Appl. No.: 561,264

[52] U.S. Cl. .................. 426/72; 426/74; 426/97; 426/648; 119/1; 424/357
[51] Int. Cl.² .................. A23K 1/175; A23K 1/18
[58] Field of Search ......... 426/2, 805, 648, 74, 311, 426/73, 90, 96, 97; 119/1; 252/88, 184, 182; 424/145, 147, 357, 252, 236, 237, 266, 281, 295, 319, 325

[56] References Cited
UNITED STATES PATENTS

| | | | |
|---|---|---|---|
| 2,531,439 | 11/1950 | Jordan | 426/72 |
| 2,649,759 | 8/1953 | Gibbs | 119/1 |
| 2,926,085 | 2/1960 | Geerlings | 426/74 |
| 3,356,569 | 12/1967 | Nicodemus | 426/72 |
| 3,428,457 | 2/1969 | Hutchinson | 426/2 |

*Primary Examiner*—Norman Yudkoff
*Assistant Examiner*—Curtis P. Ribando
*Attorney, Agent, or Firm*—Harrington A. Lackey

[57] ABSTRACT

A mixture of predominantly finely divided clay principally consisting of aluminum silicate and sodium bentonite in combination with small amounts of minerals, including iron and zinc, and vitamins, particularly adapted for application to the floor of a farrowing house to prevent knee abrasions to small pigs, to absorb excess moisture, and to provide a food supplement for the baby pigs.

6 Claims, No Drawings

PULVERULENT VITAMIN AND MINERAL-FORTIFIED CLAY PRODUCT FOR FARROWING HOUSE FLOOR

BACKGROUND OF THE INVENTION

This invention relates to a clay product, and more particularly to a mixture of clay, minerals and vitamins for application to the floor of a farrowing house.

Feed or diet supplements for pigs, and particularly baby pigs, including minerals, particularly iron, and vitamins are well-known in the art.

When pigs are born, they are kept in a farrowing house with their mother until they are properly weaned and able to eat ordinary feeds on their own. The farrowing houses are usually made with hard concrete floors to facilitate maintenance and cleanliness of the farrowing house. Accordingly, the tender knees of the baby pigs are frequently skinned or abraded upon the hard concrete floors as the young pigs stumble and fall while they are learning to walk.

Also, while the young pigs are being weaned in the farrowing houses, they should receive dietary vitamin and mineral supplements, usually in the form of shots, but occasionally in the form of specially prepared feeds administered orally before their teeth have formed.

SUMMARY OF THE INVENTION

It is therefore an object of this invention to provide a unique mixture of finely divided clays, vitamins and minerals, which is especially adapted for applying, spreading, or sprinkling upon the farrowing house floor until the entire floor is covered, thereby protecting the knees of the baby pigs against abrasion and skinning. The vitamins and minerals within the mixture are included to provide a dietary feed supplement for the baby pigs when they explore the floor with their snouts.

This product includes predominantly one or more finely divided clays mixed with several minerals and vitamins which are necessary or desirable for the nourishment and development of the baby pigs. Preferably, the clays include a mixture of aluminum silicate and sodium bentonite. The minerals should include iron and zinc in relatively large quantities and copper, cobalt, and manganese in trace quantities.

Preferably, the vitamins include vitamin A, vitamin D, riboflavin, pantothenic acid, niacin, vitamin K, vitamin $B_{12}$, and choline chloride. The iron may be in the form of iron carbonate and iron sulphate, while the zinc is preferably in the form of zinc proteinate and some zinc oxide. The trace minerals may be copper oxide, cobalt carbonate and manganese oxide.

Preferably, the mixture includes small amounts of iodine in the form of ethylene diamine dihydro-iodide (EDDI).

DESCRIPTION OF THE PREFERRED EMBODIMENTS

The product made in accordance with this invention for application or distribution upon the floor of a farrowing house is principally a mixture of one or more clays, a plurality of minerals and a plurality of vitamins.

The clays constitute approximately 91 – 96% by weight of the total mixture, whereas the minerals include about 3.5 – 8% by weight and the vitamins 0.5 – 1.0% by weight of the total mixture.

In the preferred form of the invention, the clays are preferably aluminum silicate and sodium bentonite. The two clays may be mixed with each other in proportionate amounts ranging from 15 – 50% by weight of the total mixture of aluminum silicate and 81 – 41% by weight of the total mixture of the sodium bentonite. Thus, in a total mixture of the final product of 2,000 lbs. or one ton, the aluminum silicate would constitute 300 – 1,000 lbs., while the sodium bentonite might range from 1,565 – 865 lbs.

Of the total amount of minerals, iron and zinc should be present in substantial amounts, whereas trace amounts of copper, cobalt and manganese are desirable.

In the preferred form of the invention, the iron would be in the form of iron carbonate (42% Fe) and iron sulphate (21% Fe), while the zinc would preferably be in the form of zinc proteinate, with possibly trace amounts of zinc oxide. The trace minerals would include copper in the form of copper oxide, cobalt in the form of cobalt carbonate and manganese in the form of manganese oxide.

In the total 2,000 lb. mixture, the iron carbonate would be in the amount of 20 – 50 lbs. or 1 – 2.5% by weight; the iron sulphate would be in the amount of 20 – 50 lbs., also 1 – 2.5% by weight, while the zinc proteinate would preferably be in the amount of 20 – 40 lbs., or 1 – 2% by weight of the total mixture.

The total amount of the trace minerals including some trace amounts of iron and zinc would be approximately 10 – 20 lbs. or 0.5 – 1.0% by weight of the total mixture.

The vitamins incorporated in the mixture preferably include vitamin A, vitamin $D_3$, riboflavin, pantothenic acid, niacin, vitamin K, vitamin $B_{12}$ and an anti-oxidant. In a total vitamin base mix of 10 lbs. in a 2,000 lb. mixture, 0.5% by weight of the total mixture, a preferred formulation for the vitamins would be as follows:

| | |
|---|---|
| VITAMIN A | 8,262,800 U.S.P. units per lb. |
| VITAMIN $D_3$ | 2,270,000 I.C. units per lb. |
| RIBOFLAVIN | 8,100 mgms. per lb. |
| PANTOTHENIC ACID | 20,250 mgms. per lb. |
| NIACIN | 40,228 mgms. per lb. |
| VITAMIN K | 2,043 mgms. per lb. |
| VITAMIN $B_{12}$ | 30 mgms. per lb. |
| ANTI-OXIDANT | Sufficient amount to function as a preservative |

The trace minerals would also include 0.04% by weight iodine in the form of ethylene diamine dihydro-iodide (EDDI).

Furthermore, the trace minerals would be mixed in a carrier of calcium carbonate.

Thus, a preferred form of the formulation for the trace minerals for a total weight of 10 lbs. or 0.5% by weight of the total mixture would be as follows:

| | |
|---|---|
| COPPER | 0.6% by weight from copper oxide (CuO) |
| IRON | 6% by weight from iron sulphate |
| COBALT | 0.1% by weight from cobalt carbonate |
| ZINC | 6% by weight from zinc oxide |
| MANGANESE | 4% by weight from manganese oxide |
| IODINE | 0.4% from EDDI |
| CALCIUM CARBONATE | (carrier) balance by weight |

In addition to the above trace vitamins, the vitamin choline chloride (50%) in the amount of 5 – 10 lbs. in a total mixture of 2,000 lbs., or 0.25 – 0.50% by weight of the total mixture, is preferably used in the formulation of the total mixture.

All of the vitamins and minerals function as a dietary or feed supplement for the baby pigs, which are easily accessible for oral intake by the baby pigs on the floor of the farrowing house. The availability of the vitamins and minerals would eliminate the necessity of catching the baby pigs and injecting them with shots of vitamin and mineral supplements, unless for some unusual reason the baby pig does not ingest the pulverized mixture on the farrowing house floor.

All of the elements in the mixture, and particularly the clays, are finely divided to provide maximum absorbency for water, moisture and other liquids deposited on the farrowing house floor. The alumina ($A_2O_3$) within the aluminum silicate is also highly water absorbent.

But most importantly, all of the finely divided elements, and particularly the smooth and bulky clay particles in the form of the aluminum silicate and the sodium bentonite, provide a smooth, resilient and soft cover over the hard concrete floor of the farrowing house to yield and absorb the shock on the knees of the baby pigs falling or skidding upon the farrowing house floor, and also preventing abrasions in the tender skin of the baby pigs' knees.

What is claimed is:

1. A pulverent material for application to the floor of a farrowing house to prevent knee abrasions and to provide nourishment to baby pigs, comprising a mixture of:
   a. 0.05 – 1.0% by weight vitamins comprising riboflavin, pantothenic acid, niacin and choline chloride,
   b. 3.5 – 8.0% by weight minerals comprising iron and zinc,
   c. the balance a finely divided clay comprising a mixture of 15–50% by weight of aluminum silicate and 81–41% by weight of sodium bentonite.

2. The invention according to claim 1 in which said iron and zinc minerals are in the form of iron carbonate, iron sulphate, and zinc proteinate.

3. The invention according to claim 2 in which said iron carbonate comprises 1 – 2.5%, said iron sulphate comprises 1 – 2.5%, and said zinc proteinate comprises 1 – 2%, by weight of said total mixture.

4. The invention according to claim 1 in which said choline chloride comprises 0.25 – 0.50% by weight of said total mixture and said riboflavin, pantothenic acid, and niacin comprise substantially smaller amounts by weight than said choline chloride.

5. The invention according to claim 4 in which said vitamins further comprise trace amounts of vitamin A, vitamin $D_3$, vitamin K, and vitamin $B_{12}$.

6. The invention according to claim 1 in which said trace minerals comprise copper, cobalt and manganese.

* * * * *